United States Patent
Morgan et al.

(10) Patent No.: US 10,776,298 B2
(45) Date of Patent: Sep. 15, 2020

(54) MULTI-DEVICE DATA STORAGE MODULE

(71) Applicant: Seagate Techology, LLC, Cupertino, CA (US)

(72) Inventors: Michael Gene Morgan, Los Altos Hills, CA (US); Pierre Le Bars, Saint Paul de Varces (FR); Paul Mcparland, San Jose, CA (US); Timothy Bucher, Geyserville, CA (US)

(73) Assignee: Seagate Technology, LLC, Fremont, CA (US)

( * ) Notice: Subject to any disclaimer, the term of this patent is extended or adjusted under 35 U.S.C. 154(b) by 44 days.

(21) Appl. No.: 15/850,514

(22) Filed: Dec. 21, 2017

(65) Prior Publication Data

US 2018/0181514 A1    Jun. 28, 2018

Related U.S. Application Data

(60) Provisional application No. 62/437,865, filed on Dec. 22, 2016.

(51) Int. Cl.
| | |
|---|---|
| *G06F 13/38* | (2006.01) |
| *G06F 3/06* | (2006.01) |
| *G06F 1/16* | (2006.01) |
| *G06F 1/3234* | (2019.01) |
| *G06F 1/18* | (2006.01) |

(52) U.S. Cl.
CPC .............. *G06F 13/385* (2013.01); *G06F 1/16* (2013.01); *G06F 1/187* (2013.01); *G06F 1/3268* (2013.01); *G06F 3/0604* (2013.01); *G06F 3/0685* (2013.01)

(58) Field of Classification Search
None
See application file for complete search history.

(56) References Cited

U.S. PATENT DOCUMENTS

| | | | | |
|---|---|---|---|---|
| 5,025,335 | A | * 6/1991 | Stefansky | ............ G11B 5/5526 360/137 |
| 5,506,750 | A | 4/1996 | Carteau et al. | |
| 5,778,254 | A | * 7/1998 | Ohtsuka | .................. G06F 1/184 710/38 |
| 6,226,143 | B1 | * 5/2001 | Stefanksy | ............ G11B 5/5526 360/99.2 |
| 6,459,571 | B1 | 10/2002 | Carteau | |
| 6,501,645 | B1 | * 12/2002 | Hanazawa | ............. G11B 33/08 248/632 |
| 6,510,050 | B1 | 1/2003 | Lee et al. | |
| 7,200,008 | B1 | 4/2007 | Bhugra | |
| 7,203,060 | B2 | 4/2007 | Kay et al. | |

(Continued)

*Primary Examiner* — Henry Tsai
*Assistant Examiner* — Aurangzeb Hassan
(74) *Attorney, Agent, or Firm* — Hall Estill Attorneys at Law

(57) ABSTRACT

A data storage system can employ one or more data storage modules that each have multiple constituent data storage devices. A plurality of data storage devices can be connected to a control board within a single housing with the control board having a number of SATA outputs connected to each of the plurality of data storage devices. The number of SATA outputs may be less than a total number of data storage devices in the plurality of data storage devices. Each SATA output can be connected to a separate first-tier port multiplier that has circuitry to split a single set of SATA signals into multiple duplicate sets of SATA signals.

16 Claims, 5 Drawing Sheets

(56) References Cited

U.S. PATENT DOCUMENTS

| | | |
|---|---|---|
| 7,312,999 B1 | 12/2007 | Miyamura et al. |
| 7,634,375 B1 | 12/2009 | Pakzad et al. |
| 8,456,832 B1 | 6/2013 | Brigham, Jr. et al. |
| 9,412,411 B1 | 8/2016 | Rancour et al. |
| 9,767,856 B2 | 9/2017 | Shinsato |
| 2003/0138325 A1* | 7/2003 | Su .................. G06F 1/206 416/248 |
| 2006/0187634 A1* | 8/2006 | Tanaka ............... G06F 1/181 361/679.33 |
| 2007/0047537 A1* | 3/2007 | Chen ................ G06F 3/0683 370/366 |
| 2007/0180172 A1* | 8/2007 | Schmidt ............ G06F 13/385 710/105 |
| 2007/0294777 A1* | 12/2007 | Kobayashi ......... G11B 33/08 726/34 |
| 2008/0172527 A1* | 7/2008 | Hsu .................. G06F 1/187 711/114 |
| 2009/0106472 A1* | 4/2009 | Ji ..................... G06F 13/385 710/305 |
| 2011/0022744 A1* | 1/2011 | Sun ................... G06F 3/0632 710/51 |
| 2011/0283025 A1* | 11/2011 | Maxwell ............ G06F 3/0607 710/16 |
| 2014/0208025 A1* | 7/2014 | Asano ............... G06F 3/0619 711/114 |
| 2014/0310441 A1* | 10/2014 | Klughart ............ G06F 3/0608 710/301 |
| 2015/0052276 A1* | 2/2015 | Klughart ............ G06F 3/0608 710/301 |
| 2015/0161073 A1* | 6/2015 | Beeson .............. G06F 3/067 710/110 |
| 2015/0220478 A1* | 8/2015 | Klughart ............ G06F 3/0608 710/313 |
| 2016/0217097 A1 | 7/2016 | Gomez et al. |
| 2017/0115723 A1* | 4/2017 | Shurin ............... G06F 1/3206 |
| 2018/0129432 A1* | 5/2018 | Kowles .............. G06F 11/2087 |

\* cited by examiner

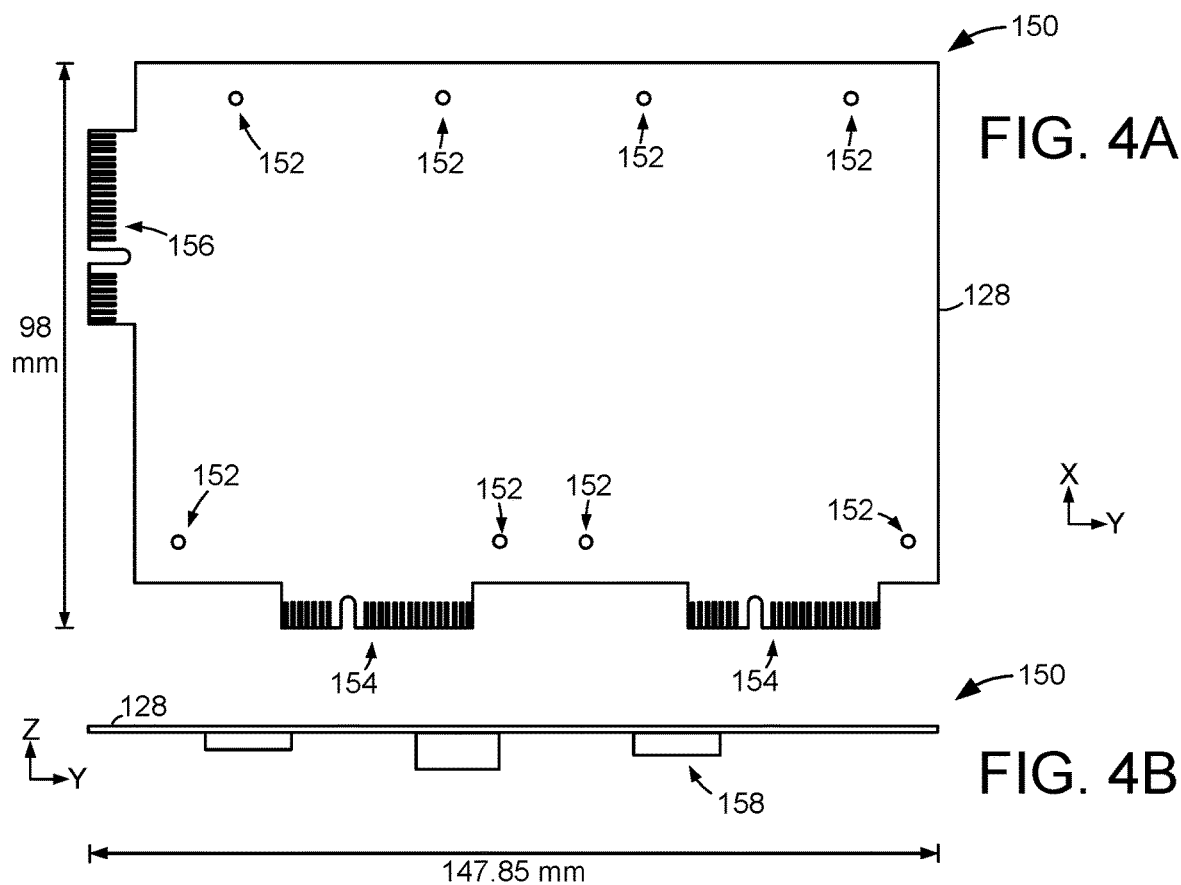
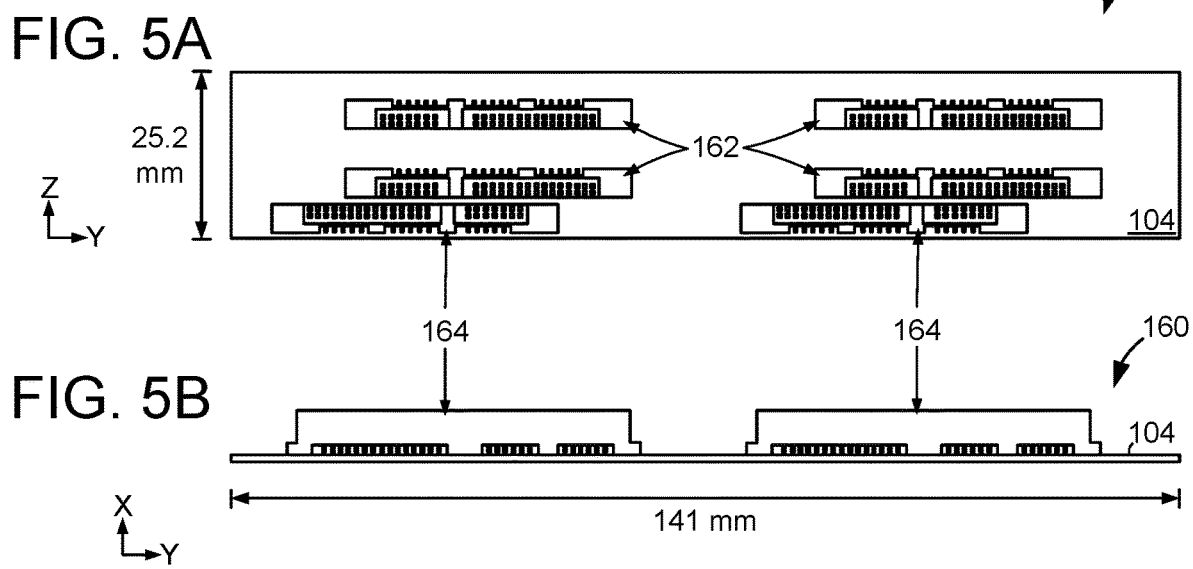

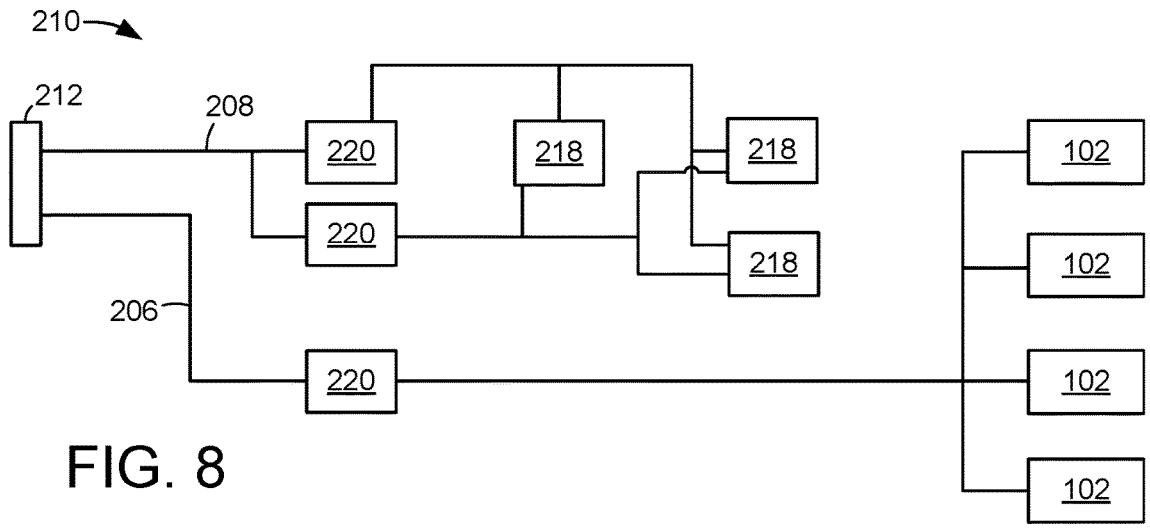
FIG. 8
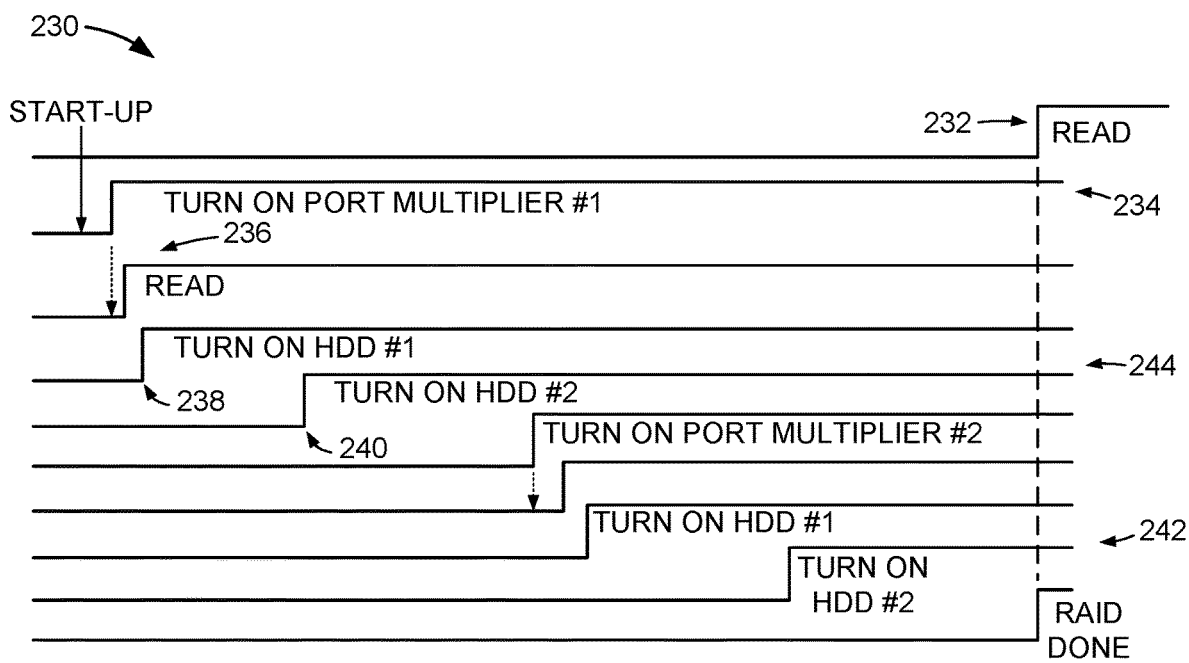
FIG. 9
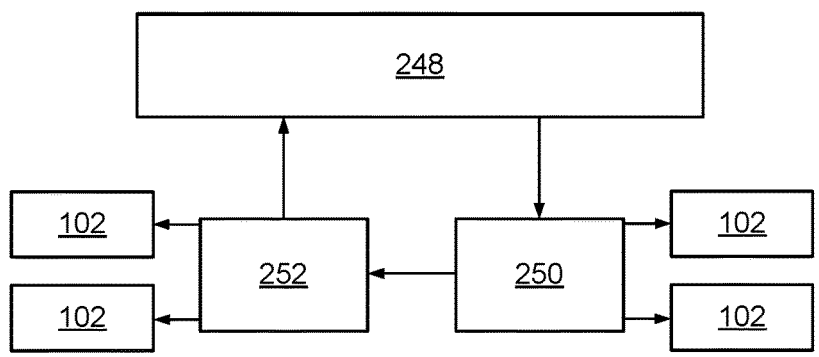

MULTI-DEVICE DATA STORAGE MODULE

RELATED APPLICATION

This application makes a claim of domestic priority under 35 U.S.C. 119(e) to U.S. Provisional Application No. 62/437,865 filed Dec. 22, 2016, the contents of which are hereby incorporated by reference.

SUMMARY

A data storage system, in accordance with assorted embodiments, consists of a plurality of data storage devices connected to a control board within a single housing with the control board having a number of SATA outputs connected to each of the plurality of data storage devices. The number of SATA outputs is less than a total number of data storage devices in the plurality of data storage devices. Each SATA output is connected to a separate first-tier port multiplier that has circuitry to split a single set of SATA signals into multiple duplicate sets of SATA signals.

In some embodiments, a rack houses a plurality of separate data storage modules with each data storage module having a plurality of data storage devices connected to a control board within a single housing with the control board having a number of SATA outputs connected to each of the plurality of data storage devices. The number of SATA outputs is less than a total number of data storage devices in the plurality of data storage devices. Each SATA output is connected to a separate first-tier port multiplier that has circuitry to split a single set of SATA signals into multiple duplicate sets of SATA signals.

A plurality of data storage devices are each connected to a control board within a single housing configured in accordance with various embodiments. The control board has a number of SATA outputs connected to each of the plurality of data storage devices, with the number of SATA outputs being less than a total number of data storage devices in the plurality of data storage devices. Each SATA output is connected to a separate first-tier port multiplier that has circuitry to split a single set of SATA signals into multiple duplicate sets of SATA signals. Supply of power to the first-tier port multiplier precedes initialization of a first second-tier port multiplier and a subsequent powering of a second second-tier port multiplier in response to the first second-tier port multiplier being initialized. The first and second second-tier port multipliers are each connected to less than all of the plurality of data storage devices.

BRIEF DESCRIPTION OF THE DRAWINGS

FIGS. 4A and 4B respectively provide a line representation of a portion of an example data storage module.

FIGS. 5A and 5B respectively convey a line representation of a portion of an example data storage module.

FIG. 8 displays an electrical schematic of portions of an example data storage module.

FIG. 9 is a timing diagram corresponding to portions of an example data storage module operated in accordance with some embodiments.

DETAILED DESCRIPTION

Data storage systems can be limited by the interface speed between a data storage device and a host. Interfaces, such as Gigabit Ethernet and universal serial bus (USB) 3.0, have supported maximum data transfer rates that were approximately equivalent to a single data storage device, such as a 3.5" hard disk drive (HDD). External interface technology has recently advanced to provide data transfer rates, such as 2750 MB/s, that far exceed the data production rate of a single HDD. Such heightened data transfer capability has created a new opportunity to combine multiple HDDs in a data storage system in order to aggregate performance of many HDD recording channels.

While interfaces can support multiple data storage devices, the physical size of a data storage enclosure can be problematic. For instance, a data storage enclosure that houses multiple 3.5" HDDs can consist of one or more relatively large power supplies, circuit boards, structural supports, cabling, and cooling fans, which can be physically large, heavy, and cumbersome. With these issues in mind, various embodiments are directed to utilizing a single HDD enclosure to house multiple, physically smaller HDDs to generate large volumes of data that can saturate the high data transfer rates of advanced interfaces.

Figure 1:
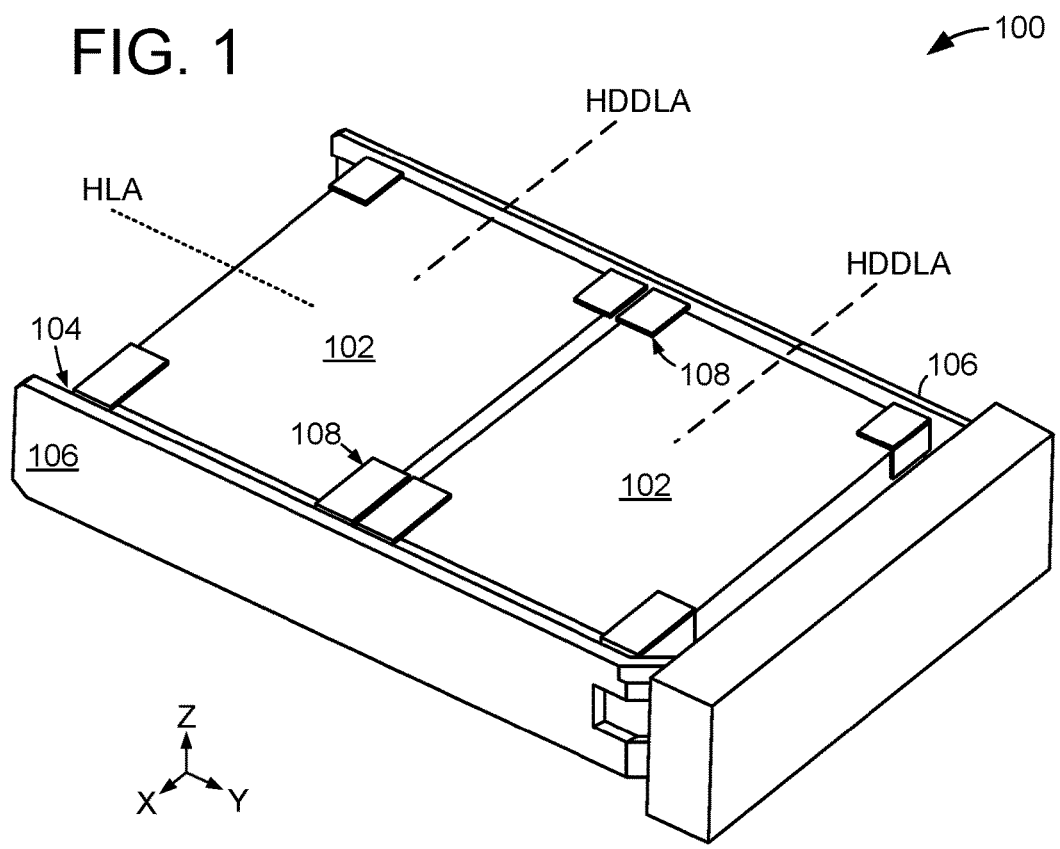
FIG. 1 displays an example data storage module that may be employed in accordance with various embodiments.

FIG. 1 illustrates an isometric view line representation of an example multi-device data storage module 100 that can be employed in a data storage system in accordance with assorted embodiments. The module has a plurality of independent HDDs 102 that are each physically and electrically connected to a single interface board 104. It is noted that an HDD 102 can have one or more rotating magnetic media accessed by at least one transducing head. While not limiting, the HHDs 102 can be a 2.5" form factor and the interface board 104 may be a serial AT attachment (SATA) circuit board. It is noted that the respective HDDs 102 are vertically stacked in the Z direction and each HDD 102 has a longitudinal axis (HDDLA) that is oriented perpendicular to the longitudinal axis of the housing (HLA).

Figure 2:
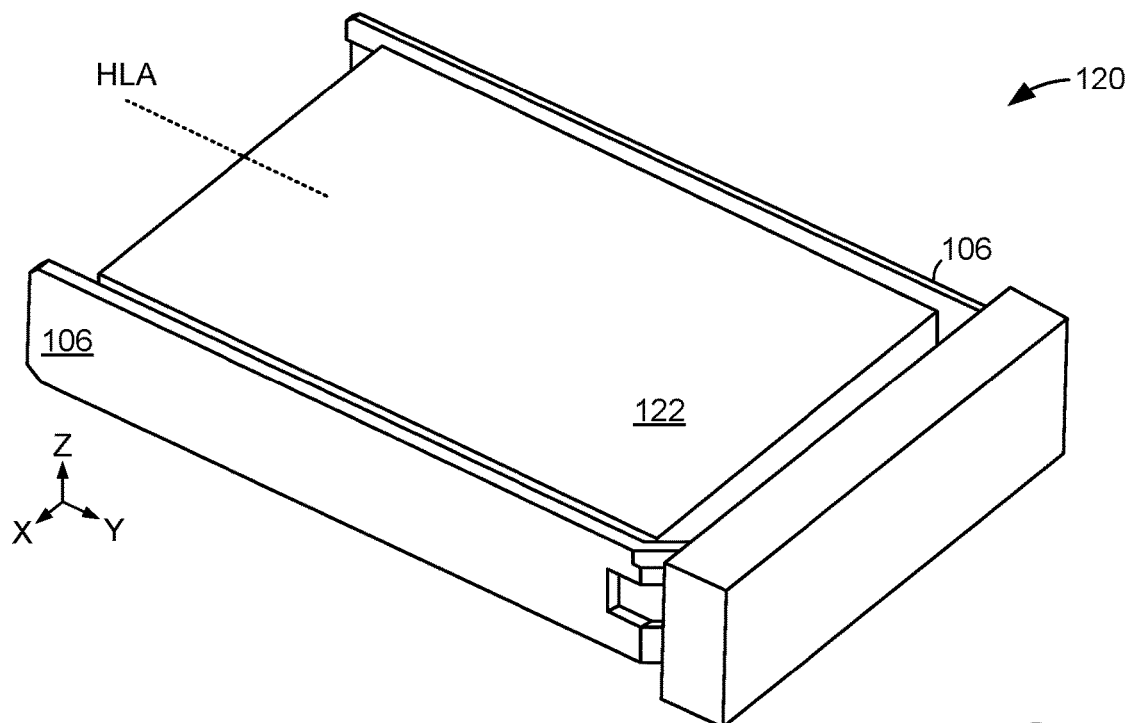
FIG. 2 is an example 3.5" form factor data storage device and carrier.

The various HDDs 102 are secured to a collective housing 106 via one or more brackets 108. The housing 106 may be sized to accommodate a single 3.5" form factor HDD with a 26 mm height, as shown by enclosure 120 of FIG. 2 in which a single HDD 122 is housed. Instead, the present embodiments utilize the bracket(s) 108 to secure four or more 2.5" form factor HDDs with a 7 mm height into the same housing 106, parallel to the Z axis. Such module 100 configuration allows high data throughput that can utilize the large data transfer capabilities of external interfaces, such as greater than 2500 MB/s. It is contemplated that any number of HDDs 102 can be incorporated into the housing 106, although the maximum performance may be limited by other system interfaces, such as 6 Gb/s.

Figure 3:
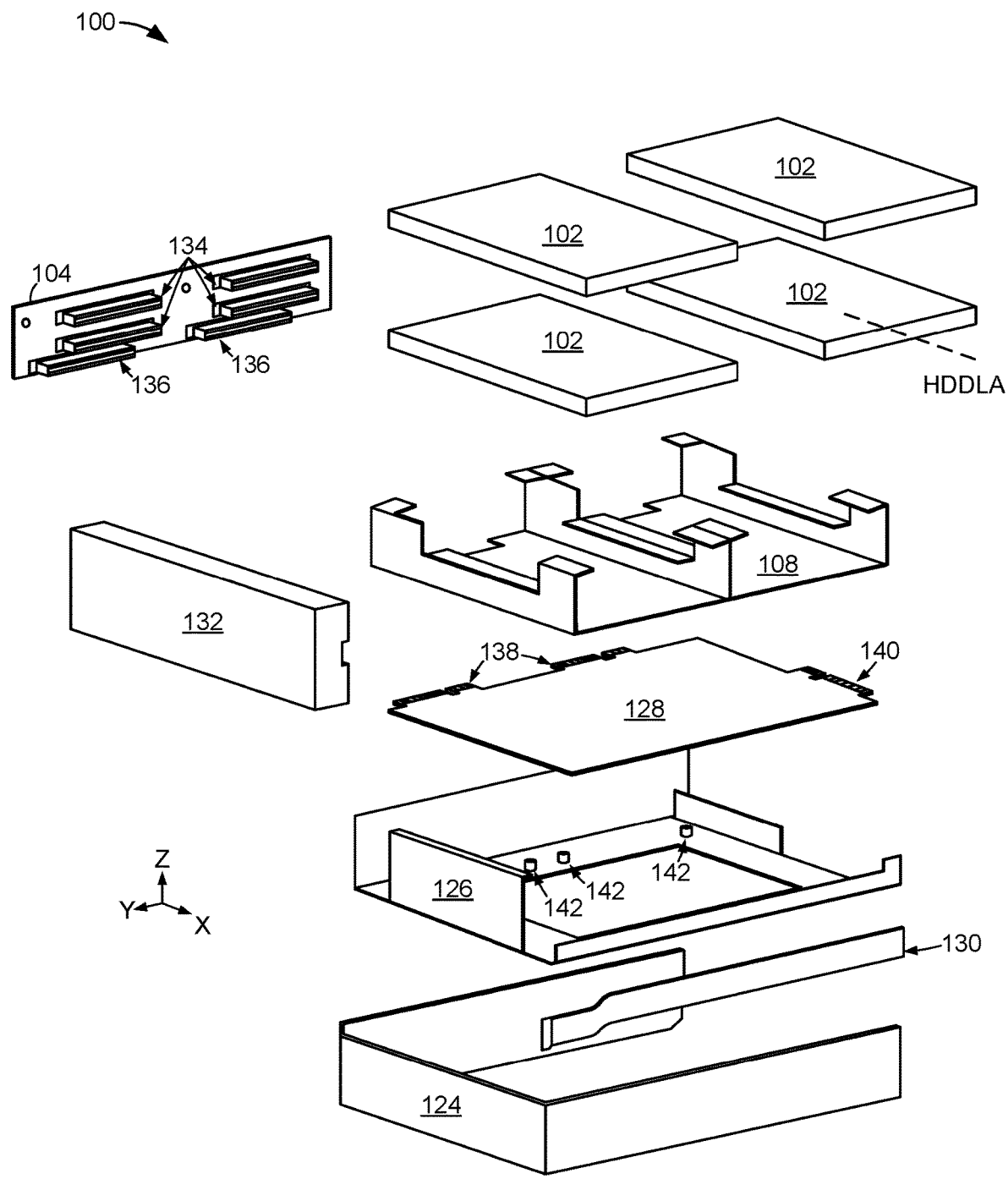
FIG. 3 depicts an exploded view of an example data storage module arranged in accordance with some embodiments.

FIG. 3 provides an exploded view line representation of the example module 100 of FIG. 1. The exploded view shows how the multiple HDDs 102 fit together with a single bracket 108 to form a single module housing, as defined by the frame 124, structural support 126, control board 128, and guide 130. The module 100 may also have a bezel 132 that can serve as a handle, pull, or vessel in which a power supply and/or cooling fan partially or completely occupy.

The single interface board 104 supports multiple physically separate drive buses 134 that are configured to align with the respective HDDs 102 along the X axis. The drive buses 134 can be interconnected to board buses 136 that are each resident on the interface board 104. It is contemplated that each board bus 136 is connected to two drive buses 134, which reduces the number of board buses 136 and board connectors 138 of the control board 128. The control board 128 may further comprise a single output connector 140 configured to concurrently interconnect each of the HDDs 102 to an external host, such as a replicator and/or controller.

The control board 128 is affixed to, but suspended above, the structural support 126 by at least two separation standoffs 142. Such construction allows the control board 128 to have optimal cooling characteristics and the capability of having electrically conductive traces on opposite sides of the board 128 without shorting to the structural support 126. The structural support 126 may attach to the bezel 132 as well as the frame 124 that positions the guide 130 so that the collective module can be efficiently inserted, and removed, from a data storage rack.

While not limiting, FIGS. 4A, 4B, 5A, and 5B respectively display the dimensions of a module control board 150 (FIGS. 4A/4B) and an interface board 160 (FIGS. 5A/5B) that can be employed together in the single data storage module 100 of FIGS. 1 & 3 in accordance with various embodiments. FIG. 4A conveys how an example control board 150 can have multiple mounting holes 152 that are aligned with standoffs 142 to allow a fastener to physically pass through and secure the board 150 to the structural support. The board 150 has two separate board connectors 154 that are arranged to concurrently mate with board busses of an interface board while an output connector 156 of the control board 150 mates with a bus of an external host.

FIG. 4B depicts how on-board circuitry 158 are affixed to the control board 150. Such circuitry 158 can have different electrical arrangements that perform different functions, operations, and logic, such as port multiplication and/or logic processing/control. It is contemplated that electrical interconnects, such as imbedded traces and cables, can provide electrical signal pathways between the on-board circuitry 158 as well as between the board 154 and output 156 connectors. The electrical interconnects can be positioned on either side of the board 150 and may continuously extend through the board 150, parallel to the Z axis.

FIG. 5A displays a front view of the interface board 160 where the various drive buses 162 are positioned. Each drive bus 162 is configured to physically and electrically connect to an HDD 102. The four drive buses 162 can be consolidated into two board buses 164. It is noted that such bus consolidation does not diminish or degrade the power or data throughput capabilities of the drive buses 162. The bottom view of FIG. 5B shows how the various buses 162/164 can extend outward to physically receive a male-type electrical connector from the respective HDDs 102 and the control board 128/150.

Figure 6:
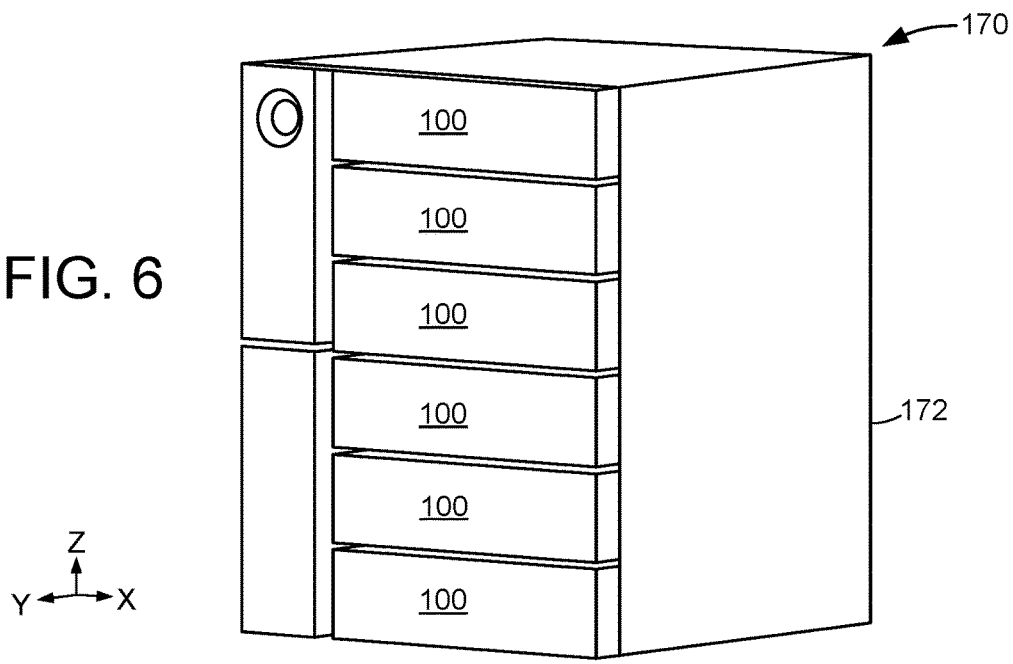
FIG. 6 shows a line representation of an example data storage rack that may employ one or more data storage modules.

Although not required or limiting, multiple separate a data storage modules 100 can concurrently be positioned within a common storage rack, which provides physical security along with consolidated vibration, power, and cooling capabilities. FIG. 6 depicts a perspective view line representation of an example storage rack 170 that can concurrently house, power, and cool multiple data storage modules 100 in accordance with various embodiments. The rack 170 can have independent processing, power, and cooling capabilities that can act alone, or in combination with the components of the respective modules 100, to provide an aggregation of data storage capacity that can utilize one or more interfaces to connect to at least one remote host. The rack 170 may consist of a single housing 172 with designated slots to allow the respective modules 100 to be installed, and removed, at will, without physically or electrically disturbing the HDDs resident in the other modules 100.

Figure 7:
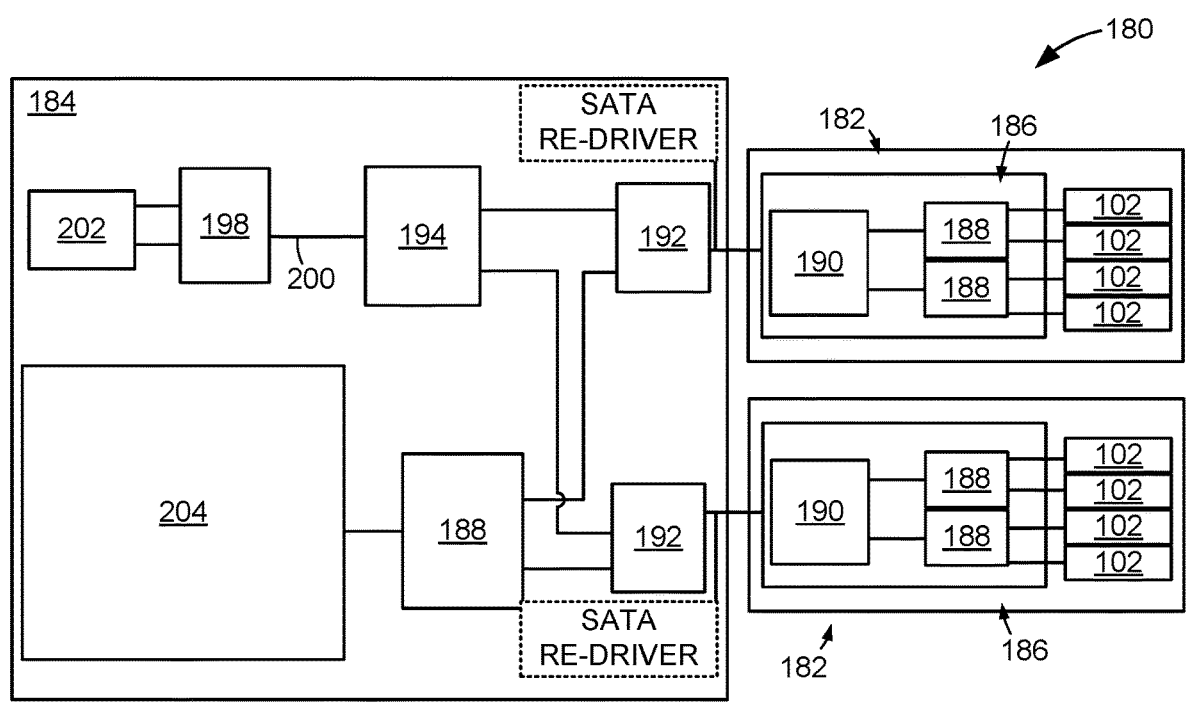
FIG. 7 illustrates an electrical schematic of portions of an example data storage module configured in accordance with various embodiments.

FIG. 7 is an electrical schematic for an example data storage system 180 that utilizes multiple data storage modules 182. The system 180 has a host board 184 that may be resident in a data storage module 182 or external to a module 182 or data storage rack 170 of modules. The host board 184 is connected to a connection board 186 that in turn is connected to four independent HDDs 102. The connection board 186 may be characterized as the interface board 104/160 and the host board 184 may be characterized as the control board 128/150 of FIGS. 1, 4, & 5.

The connection board 186 has at least two port multipliers 188 that each connect to two HDDs 102. The port multipliers 188 can independently access the HDDs 102 and may follow a frame information structure (FIS)-based switching protocol. Another port multiplier 190 can interconnect the downstream port multipliers 188 to a multiplexer 192 of the host board 184. It can be appreciated that the tiered configuration of the port multipliers 188 and 190 allows a single input to control data access operations to, and from, the four HDDs 102.

The host multiplexers 192 are each connected both to a USB controller 194 and a host controller interface 196 via SATA interfaces. The USB controller 194 connects to an upstream multiplexer 198 via a serial bus connection 200, such as USB 3.1. An external port 202 is provided to the host board 184, such as a USB Type-C port, which may be complemented by a different type of port 204, such as a Thunderbolt port, leading to the host controller interface 196 via one or more PCIe interfaces. Such configuration allows the data storage system 180 to employ dual inputs from two or more different data sources, which can optimize the ability to transfer data at high rates to and from the data storage modules 182.

For clarity, multiple portable SATA connected HDDs with a 7 mm or less height 2.5" form factor are affixed within a single 26 mm tall 3.5" form factor carrier. Two printed circuit board assemblies connect the respective HDDs with a SATA connector on a host system. SATA port multipliers are used to electrically connect the data interfaces of the respective HDDs with the SATA interface on the host system. This can be achieved either by using a single SATA port multiplier or by cascading multiple SATA port multipliers. Each port multiplier is configured as a concurrent splitter of SATA signals. As such, each port multiplier has seven separate inputs that are replicated into two sets of seven (14) separate outputs.

The respective port multipliers can have a 6 Gb/s data transfer capacity, which can be optimized by arranging a storage module 182 as a RAID 0 where data is striped across the HDDs 102 without mirroring or parity or RAID 1 where data is mirrored across the HDDs 102 without striping or parity. In contrast to the port multipliers, connecting the HDDs in parallel without SATA cabling would place high amounts of complexity while providing resistance, signal latency, and protocol compatibility issues between the controller(s) of the host board 184 and the respective HDDs 102. Accordingly, the port multipliers allow for simple, consistent SATA splitting that provides matching signals, power, and protocol to the downstream HDDs 102.

In FIG. 8, an example data storage module 210 is depicted with an electrical schematic that conveys estimated power delivery. From a SATA port 212 to the four HDDs 102, a 12V signal is provided via a first power path 214 while a 5V signal is provided via a second power path 216 that passes through multiple port multipliers 218. As shown, each path 214 and 216 has direct current (DC)-DC regulation circuitry 220 that steps down the voltage at a given efficiency. While not required, the first power path 214 can experience a 1419 mA power draw during initialization of the HDDs 102 and a 1153 mA power draw during data access operations of the HDDs 102 from the SATA port 212 to the downstream regulation circuitry 220.

The second power path 216 can experience a 346 mA power draw during initialization and a 693 mA power draw during data access operations between the SATA port 212 and the regulation circuitry 220. The first power path 214 can experience a 3200 mA power draw during HDD spin-up and a 2600 mA power draw during data access operations downstream of the regulation circuitry 220. The respective port multipliers 218 can have a 423 mA maximum power draw during initialization and a 329 mA maximum power draw during data access operations. For each of the respective HDDs 102, initialization can draw 800 mA and data access operations may draw 650 mA. Such example power draws to the port multipliers 218 and HDDs 102 corresponds with a 24 W peak power draw and a 20 W data access power draw for the data storage module 210, which further corresponds to a 12 V and 1.5 A power requirement for the first power path 214 and a 5 V and 1.1 A power requirement for the second power path.

While the peak power draw can efficiently and consistently be provided via the SATA port 212 without auxiliary or supplemental power connections, various embodiments stage power delivery to the respective port multipliers 218 and HDDs 102 to optimize data storage module 210 initialization and data access operations. FIG. 9 is a timing diagram 230 that can be conducted on a data storage module in accordance with some embodiments. Initially, a first I/O signal 232 is set to input and the second I/O signal 234 is set to output. After a first port multiplier is activated at event 236 followed by each of the HDDs of the data storage module turning, as conveyed by the two HDDs being activated in events 238 and 240. While a single module can be used, the activation of additional modules can be accommodated by a data storage system, as shown by activation of the second module 242 in a manner similar to the activation of the first module 244.

Diagram 246 illustrates an example initiation routine where an upstream port multiplier 248, such as port multiplier 190 of FIG. 7, is initially powered and subsequently powers first 250 and second 252 downstream port multipliers sequentially. As a result, less than all the HDDs 102 of a module will spin-up and initialize with peak power draw at the same time. It is contemplated that the HDDs 102 and/or port multipliers 248/250/252 can be placed in a standby, low power consumption mode during times of inactivity and subsequently be powered up again in a sequential manner. Hence, utilization of the port multipliers can deliver power intelligently to the HDDs 102 to optimize SATA signal splitting without jeopardizing consistent and ample power availability to the data storage module 230 alone and in combination with other modules in a data storage rack, such as rack 170 of FIG. 6.

With many data storage enclosures and aggregations of multiple data storage devices, a single structure is large, heavy, and cumbersome. The sequential performance of these big data storage enclosures can be achieved, and exceeded, by combining many smaller form factor (i.e. 2.5") devices. Utilizing a single module housing of a larger form factor (i.e. 3.5") to house multiple data storage devices allows existing storage enclosures and racks to be seamlessly outfitted with greater data storage, and data transfer, capabilities into network attached storage (NAS) and direct-attached storage (DAS) environments. For example, comparable data storage performance with a 50% reduction in physical size and 40% reduction in physical weight may be obtained with a multiple data storage device module configured in accordance with various embodiments.

As a result of various embodiments of a data storage module, an existing single 3.5" HDD carrier form-factor can be utilized to house four or more 2.5" HDDs that each exhibit 6 Gb/s connection in a data storage array to provide approximately 800 MB/s data access performance to, and from, the various HDDs. It is understood that each HDD is a stand-alone data storage device that can operate in any computing environment in which sufficient power can be delivered. The use of such stand-alone HDDs allows for efficient replacement of HDDs within the module, such as with hot-swapping.

What is claimed is:

1. An apparatus comprising a plurality of data storage devices connected to a control board within a single housing having a 3.5" form factor, the control board having a number of SATA outputs connected to each of the plurality of data storage devices, the number of SATA outputs being less than a total number of data storage devices in the plurality of data storage devices, each SATA output connected to a separate first-tier port multiplier, each SATA output physically contacting a separate board bus of an interface board, the first-tier port multiplier, a first second-tier port multiplier, and a second second-tier port multiplier each mounted on the interface board, each first-tier port multiplier comprising circuitry to split a single set of SATA signals into multiple duplicate sets of SATA signals.

2. The apparatus of claim 1, wherein the single housing contains a single interface board and a single control board.

3. The apparatus of claim 1, wherein each data storage device of the plurality of data storage devices has a 2.5" form factor.

4. The apparatus of claim 1, wherein the single housing has a 26 mm height and each data storage device of the plurality of data storage devices has a 7 mm height.

5. The apparatus of claim 1, wherein each data storage device of the plurality of data storage devices is a hard disk drive with a rotating magnetic media.

6. The apparatus of claim 1, wherein each SATA output of the control board physically contacts a separate board bus of a single interface board.

7. The apparatus of claim 6, wherein the interface board has a number of drive buses equal to the number of data storage devices in the plurality of data storage devices.

8. The apparatus of claim 1, wherein the control board comprises a multiplexer connected to each first-tier port multiplier.

9. The apparatus of claim 8, wherein a first data port and a second data port are each connected to the respective multiplexers via first SATA interconnection and a second SATA interconnection, the first and second SATA interconnections being independent and separate.

10. The apparatus of claim 1, wherein the first-tier port multiplier connects to a first second-tier port multiplier and a second second-tier port multiplier.

11. The apparatus of claim 10, wherein the first and second second-tier port multipliers each connect to two data storage devices of the plurality of data storage devices.

12. A system comprising a rack housing a plurality of separate data storage modules, each data storage module comprising a plurality of data storage devices connected to a control board within a single housing, the control board having a single SATA input and a number of SATA outputs connected to the data storage devices, the number of SATA outputs being less than a total number of data storage devices in the plurality of data storage devices, each SATA output of the control board physically contacts a separate board bus of an interface board, the interface board having a number of drive buses equal to the number of data storage devices in the plurality of data storage devices, each SATA output connected to a separate first-tier port multiplier, each first-tier port multiplier comprising circuitry to split a single set of SATA signals into multiple duplicate sets of SATA signals, a first data storage module of the plurality of data storage modules is physically removed from the rack while a second data storage module of the plurality of data storage modules is physically and electrically connected within the rack.

13. The system of claim 12, wherein the rack has processing, power, and cooling components separate from the respective data storage modules of the plurality of data storage modules.

14. The system of claim 12, wherein a first data storage module of the plurality of data storage module operates independently of a second data storage module of the plurality of data storage modules.

15. The system of claim 12, wherein each data storage module of the plurality of data storage modules has a guide to physically align a data storage module of the plurality of data storage modules for insertion and removal from the rack.

16. The system of claim 12, wherein the rack has a host board connected to each of the data storage modules of the plurality of data storage modules via a multiplexer.

\* \* \* \* \*